United States Patent
Ramos et al.

(10) Patent No.: US 7,320,064 B2
(45) Date of Patent: Jan. 15, 2008

(54) RECONFIGURABLE COMPUTING ARCHITECTURE FOR SPACE APPLICATIONS

(75) Inventors: Jeremy Ramos, Clearwater, FL (US); Ian A. Troxel, Gainesville, FL (US); Jason C. Noah, Redington Shores, FL (US)

(73) Assignee: Honeywell International Inc., Morristown, NJ (US)

( * ) Notice: Subject to any disclaimer, the term of this patent is extended or adjusted under 35 U.S.C. 154(b) by 371 days.

(21) Appl. No.: 10/897,888

(22) Filed: Jul. 23, 2004

(65) Prior Publication Data

US 2006/0020774 A1 Jan. 26, 2006

(51) Int. Cl.
*G06F 15/80* (2006.01)
*G06F 13/00* (2006.01)

(52) U.S. Cl. .......................... 712/226; 712/15
(58) Field of Classification Search ................ 712/226, 712/34, 35, 15
See application file for complete search history.

(56) References Cited

U.S. PATENT DOCUMENTS

| | | | |
|---|---|---|---|
| 4,922,418 A * | 5/1990 | Dolecek ................... 714/51 |
| 5,606,707 A * | 2/1997 | Tomassi et al. ............ 345/418 |
| 5,647,050 A | 7/1997 | Rhodes |
| 5,804,986 A * | 9/1998 | Jones ......................... 326/40 |
| 5,931,959 A * | 8/1999 | Kwiat ........................ 714/48 |
| 6,104,211 A * | 8/2000 | Alfke .......................... 326/91 |
| 6,263,466 B1 * | 7/2001 | Hinedi et al. ............. 714/755 |
| 6,308,191 B1 | 10/2001 | Dujardin et al. |
| 6,317,367 B1 * | 11/2001 | Sample et al. ........ 365/189.08 |
| 6,362,768 B1 * | 3/2002 | Younis et al. .............. 341/155 |
| 6,400,925 B1 * | 6/2002 | Tirabassi et al. ........... 455/12.1 |
| 6,661,733 B1 * | 12/2003 | Pan et al. ............... 365/230.05 |
| 6,662,302 B1 * | 12/2003 | Garey ....................... 713/324 |
| 6,838,899 B2 * | 1/2005 | Plants ......................... 326/9 |

(Continued)

FOREIGN PATENT DOCUMENTS

| | | |
|---|---|---|
| WO | WO 99/48103 | 9/1999 |
| WO | 02097986 | 12/2002 |

OTHER PUBLICATIONS

Carmichael et al., SEE and TID Extension Testing of the XILINX XQR18V04 4Mbit Radiation Hardened Configuration Prom, Military and Aerospace Programmable Logic Devices , pp. 1, 5, 10; figure 5, 2002, Publisher: XILINIX, Published in: US.

Carmichael, Correcting Single-Event Upsets Thruogh Virtex Partial Configuration, XILINIX Application Note 216, Jun. 1, 2000, Publisher: XILINIX, Published in: US.

(Continued)

*Primary Examiner*—Eric Coleman
(74) *Attorney, Agent, or Firm*—Fogg & Powers LLC (57) ABSTRACT

A reconfigurable computer includes a reconfigurable processing element configured to process raw payload data in accordance with a configuration that is applied to the reconfigurable processing element. The reconfigurable computer further includes a multi-port communication device comprising a first port at which at least a portion of the raw payload data is written to the multi-port communication device and a second port at which at least a portion raw payload data written to the multi-port communication device is read by the reconfigurable processing element. The reconfigurable computer further includes a controller coupled to the reconfigurable processing element. The controller applies the configuration to the reconfigurable processing element and wherein the controller performs at least one single event upset mitigation operation.

31 Claims, 5 Drawing Sheets

U.S. PATENT DOCUMENTS

| | | |
|---|---|---|
| 6,996,443 B2 * | 2/2006 | Marshall et al. .............. 700/87 |
| 7,036,059 B1 * | 4/2006 | Carmichael et al. ........ 714/725 |
| 7,058,177 B1 * | 6/2006 | Trimberger et al. .......... 380/28 |
| 7,085,670 B2 * | 8/2006 | Odom et al. ................ 702/127 |
| 2002/0024610 A1 | 2/2002 | Zaun et al. |
| 2003/0161305 A1 | 8/2003 | Hakkarainen et al. |

OTHER PUBLICATIONS

Hulme et al., Configurable Fault-Tolerant Processor (CFTP) for Spacecraft Onboard Processing, 2004 IEEE Aerospace Conference Proceedings, Mar. 6, 2004, pp. 2269-2276, vol. 4, Publisher: IEEE, Published in: US.

Laplante, Electrical Engineering Dictionary, Engineering Handbooks Online, 2000, Publisher: ENGnetBase, Published in: US.

* cited by examiner

RECONFIGURABLE COMPUTING ARCHITECTURE FOR SPACE APPLICATIONS

TECHNICAL FIELD

The following description relates to computing in general and to computing in space applications in particular.

BACKGROUND

In one type of space application, a device traveling in space transmits data to a device located on Earth. A device traveling in space is also referred to here as a "space device." Examples of space devices include without limitation a satellite and a space vehicle. A device located on Earth is also referred to here as an "Earth-bound device." An example of an Earth-bound device is a mission control center. Data that is transmitted from a space device to an Earth-bound device is also referred to here as "downstream data" or "payload data." Examples of payload data include without limitation scientific data obtained from one or more sensors or other scientific instruments included in or on a space device.

In some applications, the quantity of payload data that is collected by and transmitted from a space device to an Earth-bound device approaches or even exceeds the physical limits of the communication link between the space device and the Earth-bound device. One approach to reducing the quantity of payload data that is communicated from a space device to an Earth-bound device is to increase the amount of processing that is performed on the space device. In other words, the space device processes the raw payload data that otherwise would be included in the downstream data. Typically, the resulting processed data is significantly smaller in size than the raw payload data. The resulting data from such processing is then transmitted from the space device to the Earth-bound device as the downstream data.

One way to process raw payload data on a space device employs application-specific integrated circuits (ASICs). Application-specific integrated circuits, while efficient, typically are mission-specific and have limited scalability, upgradeability, and reconfigurability.

Another way to process raw payload data makes use of antifuse field programmable gate arrays (FPGAs). Such an approach typically lowers implementation cost and time. Also, antifuse FPGAs typically exhibit a high degree of tolerance to radiation. However, antifuse FPGAs are typically not re-programmable. Consequently, an antifuse FPGA that has been configured for one application cannot be re-configured for another application.

Another way to process such raw payload data makes use of re-programmable FPGAs. However, re-programmable FPGAs are typically susceptible to single event upsets. A single event upset (SEU) occurs when an energetic particle penetrates the FPGA (or supporting) device at high speed and high kinetic energy. For example, the energetic particle can be an ion, electron, or proton resulting from solar radiation or background radiation in space. The energetic particle interacts with electrons in the device. Such interaction can cause the state of a transistor in an FPGA to reverse. That is, the energetic particle causes the state of the transistor to change from a logical "0" to a logical "1" or from a logical "1" to a logical "0." This is also referred to here as a "bit flip." The interaction of an energetic particle and electrons in an FPGA device can also introduce a transient current into the device.

SUMMARY

In one embodiment, a reconfigurable computer includes a reconfigurable processing element configured to process raw payload data in accordance with a configuration that is applied to the reconfigurable processing element. The reconfigurable computer further includes a multi-port communication device comprising a first port at which at least a portion of the raw payload data is written to the multi-port communication device and a second port at which at least a portion raw payload data written to the multi-port communication device is read by the reconfigurable processing element. The reconfigurable computer further includes a controller coupled to the reconfigurable processing element. The controller applies the configuration to the reconfigurable processing element and wherein the controller performs at least one single event upset mitigation operation.

In another embodiment, a system includes a source of raw payload data and a reconfigurable computer. The reconfigurable computer includes a reconfigurable processing element configured to process the raw payload data in accordance with a configuration that is applied to the reconfigurable processing element. The reconfigurable computer further includes a multi-port communication device comprising a first port at which at least a portion of the raw payload data is written to the multi-port communication device and a second port at which at least a portion raw payload data written to the multi-port communication device is read by the reconfigurable processing element. The reconfigurable computer further includes a controller coupled to the reconfigurable processing element. The controller applies the configuration to the reconfigurable processing element. The controller performs at least one single event upset mitigation operation.

In another embodiment, a method includes storing payload data received at a reconfigurable computer in a first multi-port communication device and retrieving the stored payload data from the first multi-port communication device. The method further includes processing the read payload data in a reconfigurable processing element included in the reconfigurable computer. The reconfigurable processing element processes the read payload data in accordance with a configuration. The method further includes performing at least one single event upset mitigation operation.

In another embodiment, a reconfigurable computer includes a reconfigurable means for processing raw payload data in accordance with a configuration and a means for receiving at least a portion of the raw payload data and storing the at least a portion of the raw payload data. The reconfigurable computer further includes a means for retrieving the stored raw payload data and supplying the stored raw payload data to the reconfigurable means for processing and a means for applying the configuration to the reconfigurable means for processing. The reconfigurable computer further includes a means for performing at least one single event upset mitigation operation.

In another embodiment, a reconfigurable computer includes a reconfigurable processing element configured to process raw payload data in accordance with a configuration that is applied to the reconfigurable processing element. The reconfigurable computer further includes a data path comprising a multi-port memory device, the multi-port memory device comprising a first port at which at least a portion of the raw payload data is written to the multi-port memory device and a second port at which at least a portion raw payload data written to the multi-port memory device is read by the reconfigurable processing element. The reconfigurable computer further includes a control path comprising a controller coupled to the reconfigurable processing element. The controller applies the configuration to the reconfigurable processing element. The controller performs at least one single event upset mitigation operation.

The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
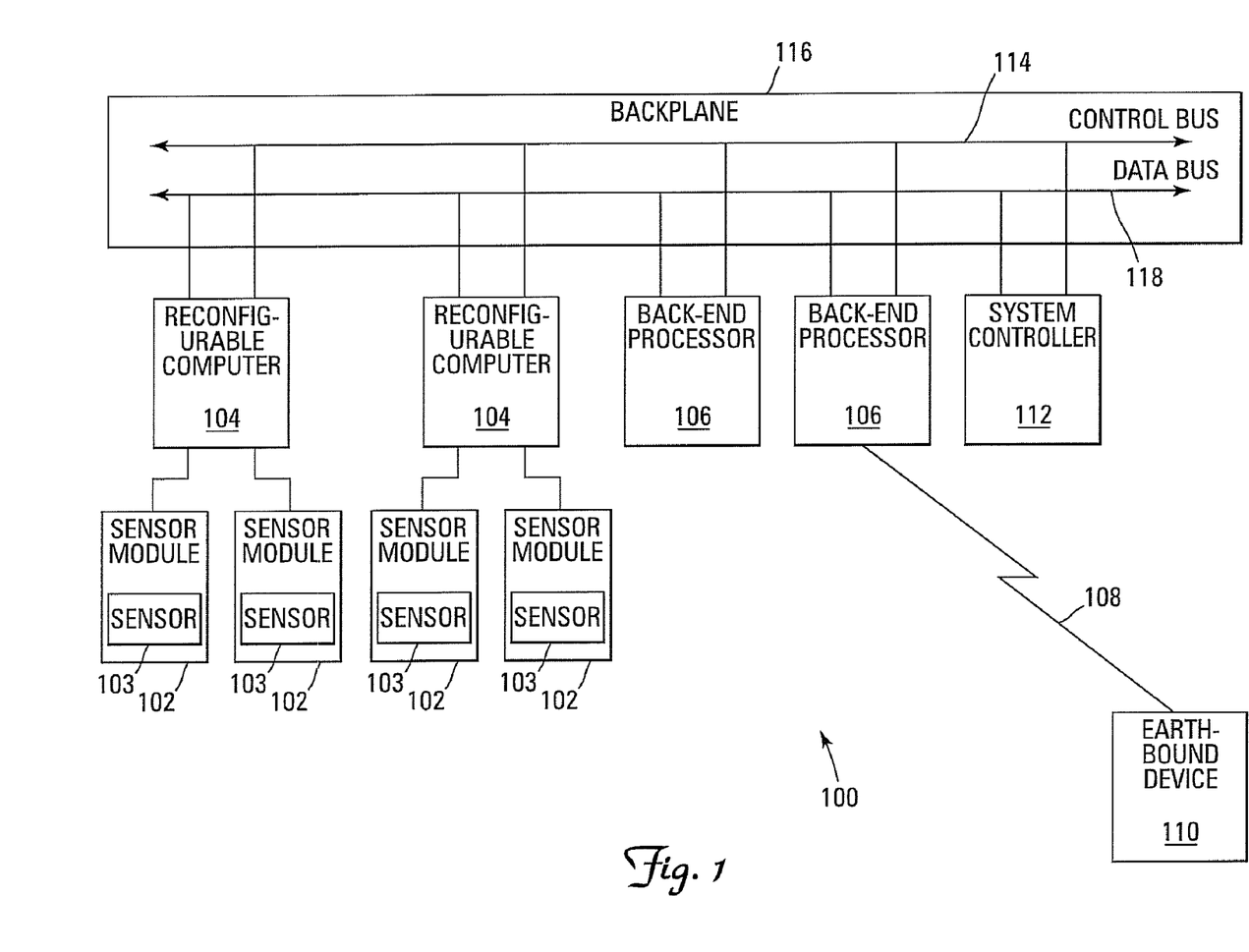
FIG. 1 is a high-level block diagram of one embodiment of a space payload processing system.

FIG. 1 is a high-level block diagram of one embodiment of a space payload processing system 100. Embodiments of system 100 are suitable for use, for example, in space devices such as satellites and space vehicles. System 100 includes one or more sensor modules 102. Each sensor module 102 is a source of raw payload data that is to be processed by the system 100. It is to be understood, however, that in other embodiments, other sources of raw payload data are used.

Each sensor modules 102 comprises one or more sensors 103. In one embodiment, the sensors 103 comprise active and/or passive sensors. Each sensor 103 generates a signal that is indicative of a physical attribute or condition associated with that sensor 103. The sensor module 102 includes appropriate support functionality (not shown) that, for example, performs analog-to-digital conversion and drives the input/output interfaces necessary to supply the sensor data to other portions of the system 100.

For example, in one embodiment, each sensor module 102 includes an array of optical sensors such as an array of charge coupled device (CCD) sensors or complimentary metal oxide system (CMOS) sensors. In another embodiment, an array of infrared sensors is used. The array of optical sensors, in such an embodiment, generates pixel image data that is used for subsequent image processing in the system 100. In other embodiments, other types of sensors are used.

The data output by the sensor modules 102 comprise raw sensor data that is processed by the system 100. More specifically, the sensor data output by the sensor modules 102 is processed by one or more reconfigurable computers 104 included in the system 100. For example, in one embodiment where the sensor modules 104 output raw image data, the one or more reconfigurable computers 104 perform one or more image processing operations such as RICE compression, edge detection, or Consultative Committee of Space Data Systems (CCSDS) protocol communications.

The processed sensor data is then provided to one or more back-end processors 106. The back-end processors 106 receive the processed sensor data as input for high-level control and communication processing performed by the front-end processors 106. In the embodiment shown in FIG. 1, one back-end processor 106 assembles appropriate downstream packets that are transmitted via a communication link 108 to an Earth-bound device 110. At least a portion of the downstream packets include the processed sensor data (or data derived from the processed sensor data) that was received from the one or more reconfigurable computers 104. The communication of payload-related data within and between the various components of system 100 is also referred to here as occurring in the "data path."

System 100 also includes a system controller 112 that monitors and controls the operation of the various components of system 100. For example, the system controller 112 manages the configuration and reconfiguration of the reconfigurable computers 104. The communication of control data within and between the various components of system 100 is also referred to here as occurring in the "control path."

Figure 2:
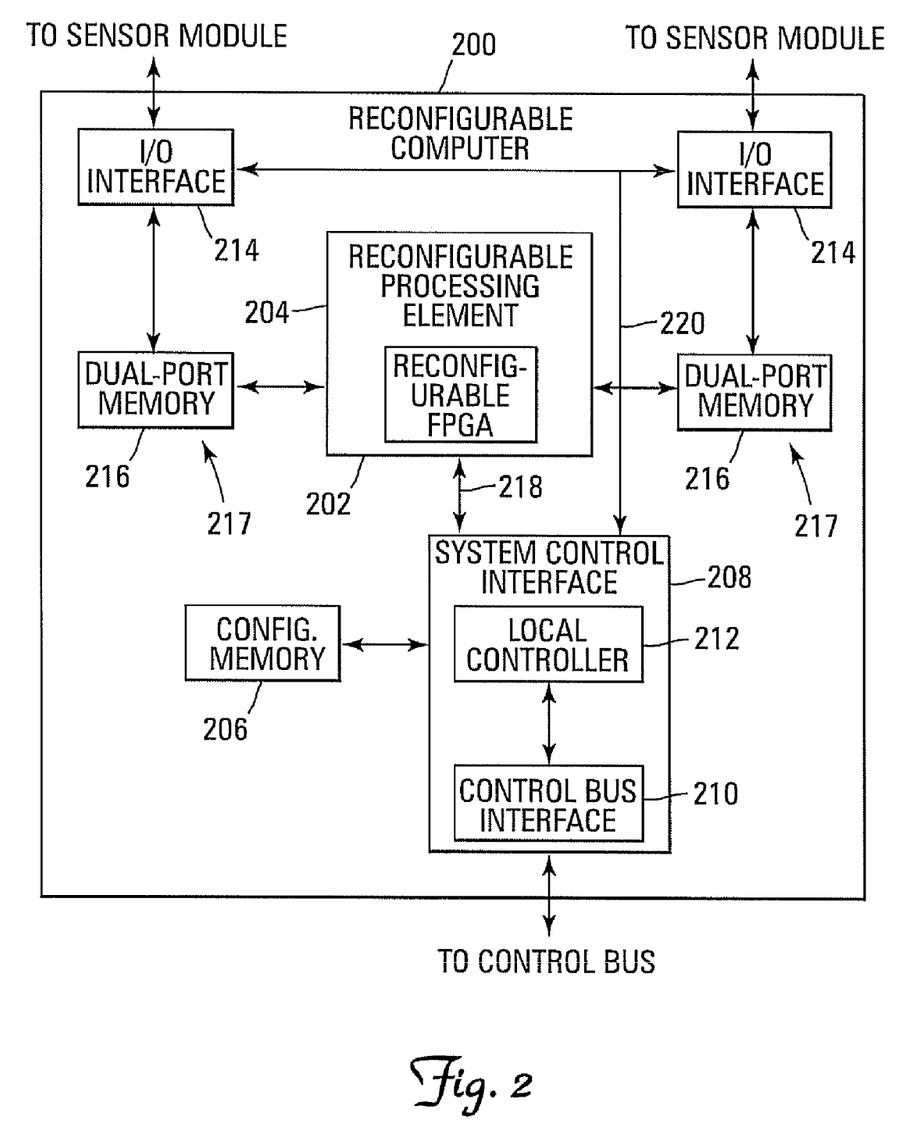
FIG. 2 is a high-level block diagram of one embodiment of a reconfigurable computer 200 for use in a space device.

The reconfigurable computer 104 is capable of being configured and re-configured. For example, the reconfigurable computer 104 is capable of being configured and re-configured at run-time. That is, the processing that is performed by the reconfigurable computer 104 can be changed while the system 100 is deployed (for example, while the system 100 is in space). In one embodiment, each reconfigurable computer 104 is implemented using one or more reconfigurable field programmable gate arrays. One such embodiment of a reconfigurable computer 104 is shown in FIG. 2.

In one embodiment, the reconfigurability of the reconfigurable computer 104 is used to fix problems in, or add additional capabilities to, the processing performed by a reconfigurable computer 104. For example while the system 100 is deployed, new configuration data can be communicated from the Earth-bound device 110 to the system 100 over the communication link 108. A reconfigurable computer 104 uses the new configuration data to reconfigure the reconfigurable computer 104.

In one embodiment, the reconfigurability of the reconfigurable computer 104 is used to allow the reconfigurable computer 104 to operate in one of multiple processing modes on a time-sharing basis. For example in one usage scenario, the reconfigurable computer 104 is configured to operate in a first processing mode during a first portion of each day and to operate in a second processing mode during second portion of each day. In this way, multiple processing modes can be implemented using the same reconfigurable computer 104, which can reduce the amount of resources (for example, cost, power, and space) used to implement such processing modes.

In the embodiment of system 100 shown in FIG. 1, each reconfigurable computer 104 and each back-end processor 106 is implemented on a separate board. Each of the boards communicate control information with one another over a control bus 114 such as a Peripheral Component Interconnect (PCI) bus or a compact PCI (cPCI) bus. The control bus 114, for example, is implemented in a backplane 116 that interconnects each of the boards. In the embodiment shown in FIG. 1, at least some of the boards communicate with one another over one or more data busses 118 (for example, one or more buses that support the RAPIDIO(R) interconnect protocol).

The sensor modules 102, in such an implementation, are implemented on one or more mezzanine boards. Each mezzanine board is connected to a corresponding reconfigurable computer board using an appropriate input/output interface such as the PCI Mezzanine Card (PMC) interface.

FIG. 2 is a high-level block diagram of one embodiment of a reconfigurable computer 200 for use in a space device. Embodiments of reconfigurable computer 200 are suitable for use in or with the system 100 shown in FIG. 1. Although the embodiment of reconfigurable computer 200 shown in FIG. 2 is described here as being implemented using the system 100 of FIG. 1, it is to be understood that other embodiments and implementations of reconfigurable computer 200 are implemented in other ways.

The reconfigurable computer 200 includes at least one reconfigurable processing element 202. The reconfigurable processing element 202 carries out the payload processing that is performed by the reconfigurable processing element 202. In the embodiment shown in FIG. 2, the reconfigurable processing element 202 comprises a reconfigurable FPGA 204 that is programmed by loading appropriate programming logic (also referred to here as an "FPGA configuration" or "configuration"). In this embodiment, one or more FPGA configurations are stored in a configuration memory 206 included in the reconfigurable computer 200. In one implementation, the configuration memory 206 is implemented using static random access memory (SRAM). In other embodiments, the one or more FPGA configurations are stored in a different location (for example, in a memory device included in the system controller 112 (shown in FIG. 1)).

In the embodiment shown in FIG. 2, the reconfigurable processing element 202 has at least one input/output interface 214 associated therewith. Each I/O interface 214 provides an interface for coupling the reconfigurable computer 200 to a device external to the reconfigurable computer 200. The external device can be a source of raw payload data and/or can use the processed payload data output by the reconfigurable processing element 202. In the embodiment shown in FIG. 2, there are two I/O interfaces 214 associated with the reconfigurable processing element 202. It is to be understood, however, that other embodiments include a different number of I/O interfaces. Indeed, one desirable attribute of the reconfigurable computer 200 is the ability of the reconfigurable computer architecture shown in FIG. 2 to support various I/O interfaces in different embodiments.

In the embodiment shown in FIG. 1, a first I/O interface 214 (individually referenced in FIG. 2 using the reference numeral 214-1) is used to couple the reconfigurable processing element 202 to a corresponding mezzanine board 118 (shown in FIG. 1). As noted above in connection with FIG. 1, a sensor module 102 is mounted on the mezzanine board 118. In one implementation, the first I/O interface 214-1 comprises a PMC interface. The second I/O interface 214 (individually referenced in FIG. 2 using the reference numeral 214-2) is used to couple the reconfigurable processing element 202 to a front-end processor 106 (shown in FIG. 1) mounted on a board 112 (shown in FIG. 1). The second I/O interface 214 couples the reconfigurable processing element 202 to the front-end processor 106 over data bus 118 included in the backplane 116. In one implementation, the second I/O interface 214-2 comprises an appropriate backplane interface (for example, a cPCI backplane interface or a backplane interface that supports the RAPIDIO(R) interconnect protocol).

The reconfigurable computer 200 also includes one or more multi-port communication devices 217 to which data can be written to and read from. In one embodiment, each multi-port communication device 217 comprises a multi-port memory device 216. In the particular embodiment shown in FIG. 2, two dual-port memory devices 216 are used, one for each of the two I/O interface 216. Each I/O interface 214 is coupled to a first port of a respective dual-port memory device 216. Each I/O interface 214 is able to read and write data from and to the respective dual-port memory device 216 using the first port. The reconfigurable processing element 202 is coupled to a second port of each of the dual-port memory devices 216. The reconfigurable processing element 202 is able to read and write data from and to each of the dual-port memory devices 216 using the second port. By providing access to memory devices in the data path using multiple ports instead of a multi-drop buses, single event upsets that multi-drop buses are susceptible to (for example, SEUs in which a tri-state signal changes from an input to an output or from an output to an input) can be avoided while at the same time improving throughput in the data path.

The reconfigurable computer 200 also includes a system control interface 208. The system control interface 208 is coupled to the reconfigurable processing element 202 over a configuration bus 218. Also, the system control interface 208 is coupled to each of the I/O interfaces 214 over a system bus 220. The system control interface 208 provides an interface by which the system controller 112 (shown in FIG. 1) is able to communicate with the reconfigurable computer 200 in order to monitor and control the operation of the processing element 202. In the embodiment shown in FIG. 2, the system control interface 208 includes a control bus interface 210. The control bus interface 210 is used to couple the system control interface 208 to the control bus 114 (shown in FIG. 1). This allows the system controller 112 and system control interface 208 to communicate over the control bus 114. In one implementation, the control bus interface 210 comprises a cPCI interface.

The system control interface 208 also includes a local controller 212. The local controller 212 carries out various control operations under the direction of the system controller 112. In the embodiment shown in FIG. 2, the local controller 212 performs various FPGA configuration management operations. The configuration management operations performed by the local controller 212 include reading an FPGA configuration from the configuration memory 206 and loading the configuration into the reconfigurable FPGA 204. The configuration management operations performed by the local controller 212 also includes single event upset (SEU) mitigation operations. Examples of such SEU mitigation operations include periodic and/or event-triggered refreshing of the FPGA configuration and/or FPGA configuration readback and compare. In one embodiment, the SEU mitigation operations described below in connection with FIGS. 3 and 4 are performed by the local controller 212.

In one implementation of the embodiment shown in FIG. 2, the system control interface 208 and the configuration memory 206 are implemented using radiation hardened components and the reconfigurable processing element 202 (including reconfigurable FPGA 204), I/O interfaces 214, and dual-port memory devices 216 are implemented using commercial off the shelf (COTS) components that are not necessarily radiation hardened. COTS components typically are less expensive, more flexible, and easier to program. Typically, the processing performed in the data path changes significantly more than the processing performed in the control path from mission-to-mission or application-to-application. Using such COTS components typically allows the reconfigurable computer 200 to be implemented more efficiently (in terms of time, cost, power, and/or space) than using radiation hardened components such as non-reconfigurable antifuse FPGAs or ASICs.

Moreover by incorporating SEU mitigation techniques in the system control interface 208, redundancy based SEU mitigation techniques such as triple modular redundancy need not be used. This reduces the amount of resources (for example, time, cost, power, and/or space) needed to implement a reconfigurable computer 200 suitable for use in a given space application using COTS components.

Figure 3:
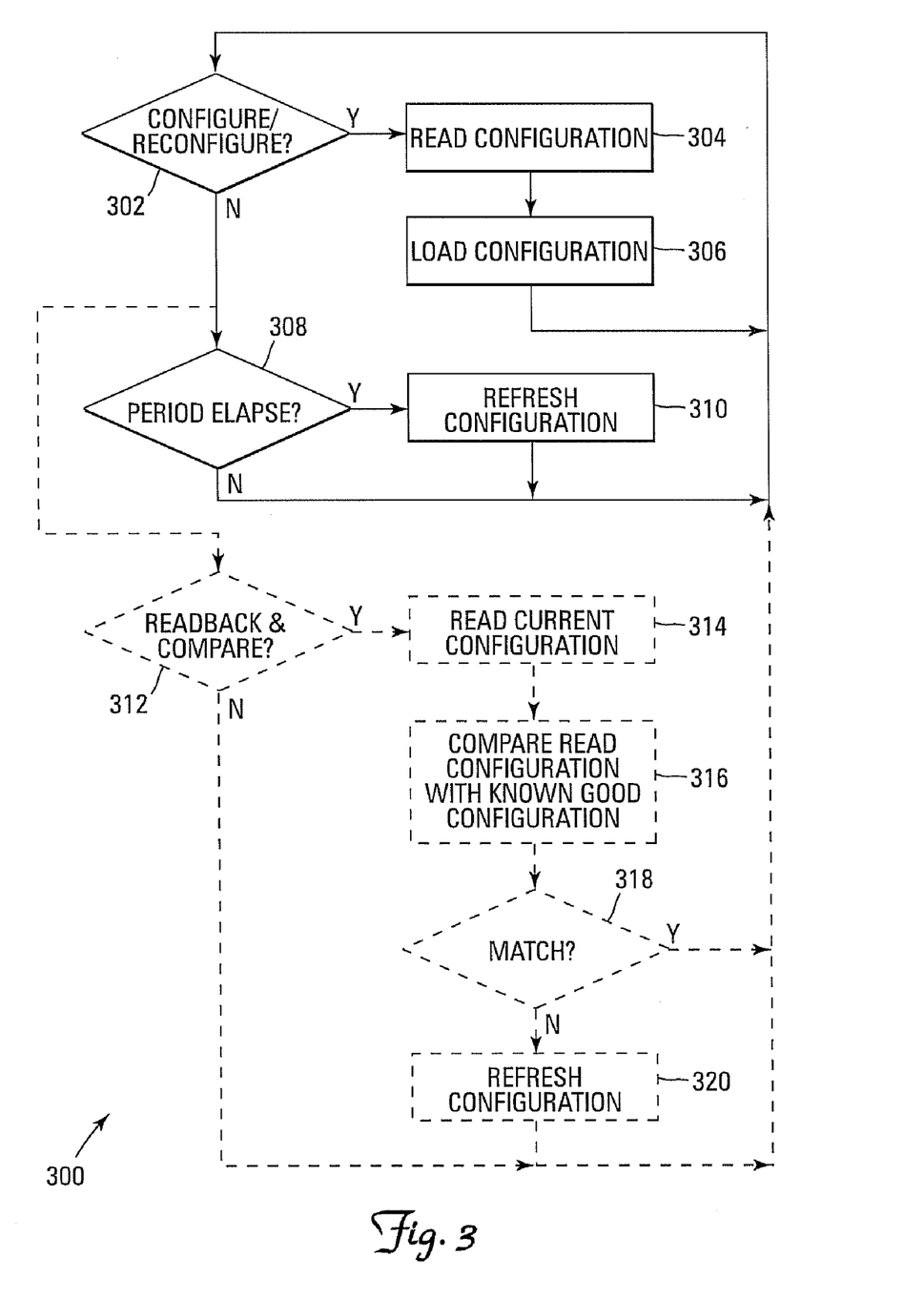
FIG. 3 is a high-level flow diagram of one embodiment of a method of control path processing performed by a reconfigurable computer used in a space device.
Figure 4:
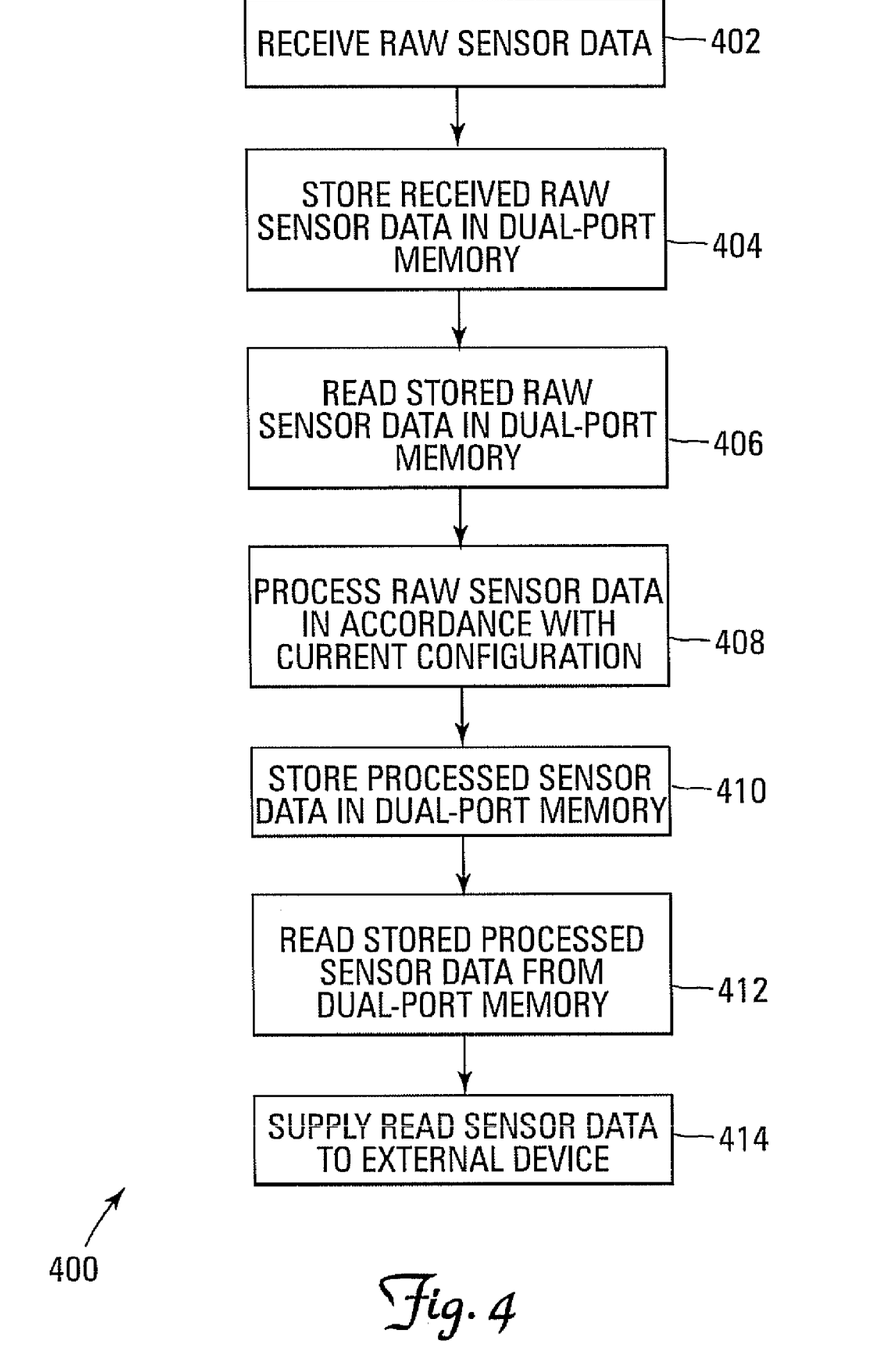
FIG. 4 is a high-level flow diagram of one embodiment of a method of data path processing performed by a reconfigurable computer used in a space device.

FIG. 3 is a high-level flow diagram of one embodiment of a method 300 of control path processing performed by a reconfigurable computer used in a space device. The embodiment of method 300 shown in FIG. 3 is described here as being implemented using the system 100 and the reconfigurable computer 200 of FIGS. 1 and 2, respectively. In particular, the embodiment of method 300 shown in FIG. 3 is described here as being implemented by the local controller 212 of the system control interface 210. In other embodiments, however, method 300 is implemented in other ways.

When the reconfigurable processing element 202 is to be configured (or reconfigured) (checked in block 302), an appropriate configuration is read from the configuration memory 206 (block 304) and loaded into the reconfigurable FPGA 204 (block 306). The reconfigurable processing element 202 is configured, for example, when the reconfigurable computer 200 initially boots after an initial system power on or after a system reset. In embodiments of the reconfigurable computer 200 that support timesharing multiple operating modes, each time the operating mode of the reconfigurable computer 200 changes the configuration for the new operating mode is read from the configuration memory 206 and loaded into the reconfigurable FPGA 204.

Also, the reconfigurable processing element 202 is configured as a part of one or more SEU mitigation operations in order to "refresh" the configuration of the reconfigurable FPGA 204. For example in the embodiment shown in FIG. 3, the configuration of the reconfigurable processing element 202 is periodically refreshed by re-loading the current configuration into the reconfigurable FPGA 204. If a predetermined period of time has elapsed since the current configuration of the reconfigurable processing element 202 was last loaded (checked in block 308), the configuration of the reconfigurable processing element 202 is refreshed (block 310). The reconfigurable processing element is refreshed by performing the processing associated with blocks 302 through 308 is performed.

An alternative embodiment of method 300 making use of a readback and compare operation is shown in FIG. 3 using dashed lines. Such a readback and compare operation is performed instead of, or possibly in addition to, periodically refreshing the configuration of the reconfigurable processing element 202. When it is time to perform such a readback and compare operation (checked in block 312), the local controller 210 reads the current configuration of the reconfigurable FPGA 204 (block 314) and compares at least a portion of the read configuration to a known-good value associated with the current configuration (block 316). If the read value does not match the known-good value (checked in block 318), the configuration of the reconfigurable processing element 202 is refreshed (block 320). That is, the processing associated with blocks 302 through 308 is performed.

For example in one implementation, such a readback and compare operation is performed by reading each byte (or other unit of data) of the current configuration of the FPGA 204 and comparing that byte to a corresponding byte of the corresponding configuration stored in the configuration memory 206. In other words, the local controller 212 performs a byte-by-byte compare. In another implementation, one or more cyclic redundancy code (CRC) (or other error correction code) values are calculated for the current configuration of the FPGA 204 and compared to corresponding CRC values stored, for example, in the configuration memory 206.

FIG. 4 is a high-level flow diagram of one embodiment of a method 400 of data path processing performed by a reconfigurable computer used in a space device. The embodiment of method 400 shown in FIG. 4 is described here as being implemented using the system 100 and the reconfigurable computer 200 of FIGS. 1 and 2, respectively. In particular, the embodiment of method 400 shown in FIG. 4 is described here as being implemented by the local controller 212 of the system control interface 210 and the processing shown in FIG. 4 implements a pipeline processing topology. In other embodiments, however, method 400 is implemented in other ways.

In the data path, the first I/O interface 214-1 receives raw sensor data from the sensor module 102 coupled to that I/O interface 214-1 (block 402). The I/O interface 214-1 stores the received raw sensor data in the dual-port memory device 216 associated with that I/O interface 214-1 (block 404). The I/O interface 214-1 uses a first port of the associated dual-port memory device 216 in order to store the received raw sensor data in the memory device 216. The processing element 202 (more specifically, the reconfigurable FPGA 204) accesses the raw sensor data stored in that dual-port memory device 216 (block 406). The processing element 202 accesses the raw sensor data stored in that dual-port memory device 216 using the second port of the memory device 216. The processing element 202 processes the raw sensor data in accordance with the current configuration of the processing element 202 (block 408). For example in one embodiment, the processing element 202 is configured to perform one or more image processing operations on the raw sensor data, which includes pixel image data received from an array of optical sensors included in the sensor module 102.

In the particular embodiment shown in FIG. 4, the reconfigurable processing element 202 writes the processed sensor data to the dual-port memory device 216 associated with the second I/O interface 214-2 (block 410). The reconfigurable processing element 202 writes the processed sensor data using one port of that dual-port memory device 216. The second I/O interface 214-2 reads the processed sensor data from the associated dual-port memory device 216 (block 412). The second I/O interface 214-2 reads the processed sensor data from that dual-port memory device 216 using the other port of the memory device 216. The second I/O interface 214-2 then supplies the read processed sensor data to the external device coupled to the second I/O interface (block 414). For example in this embodiment, the second I/O interface 214-2 supplies the processed sensor data to a front-end processor 106 mounted a board 112. The second I/O interface 214-2 supplies the processed sensor data to the front-end processor 106 over a data bus 118 included in the backplane 116.

Figure 5:
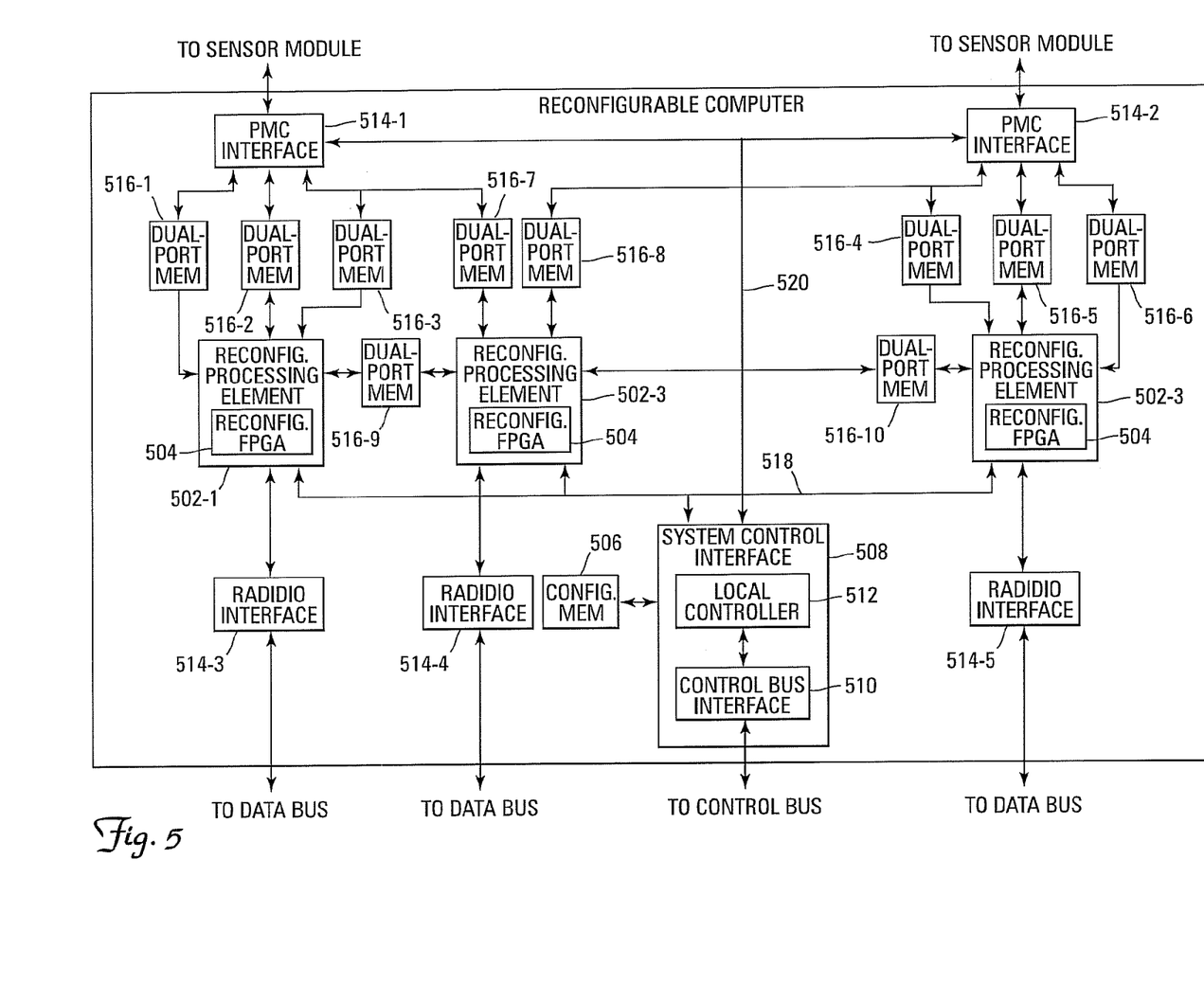
FIG. 5 is a block diagram of an alternative embodiment of a reconfigurable computer.

As noted above, FIGS. 1 through 4 illustrate an exemplary embodiment of a system 100, reconfigurable computer 200, and associated methods 300 and 400, respectively. It is to be understood that other embodiments are implemented in other ways. Indeed, the reconfigurable computing architecture illustrated in FIGS. 1 through 4 is adaptable for a wide variety of applications. For example, FIG. 5 is a block diagram of an alternative embodiment of a reconfigurable computer 500. The embodiment of reconfigurable computer 500 shown in FIG. 5 includes three reconfigurable processing elements 502. The three reconfigurable processing elements 502 are individually referenced in FIG. 5 as processing element 502-1, 502-2, and 502-3, respectively.

In the embodiment shown in FIG. 5, each of the reconfigurable processing elements 502 comprises a reconfigurable FPGA 504 that is programmed by loading appropriate FPGA configuration. In this embodiment, one or more FPGA configurations for each FPGA 504 are stored in a configuration memory 506 included in the reconfigurable computer 500. In one implementation, the configuration memory 506 is implemented using radiation-hardened static random access memory (SRAM). In other embodiments, the one or more FPGA configurations are stored in a different location (for example, in a memory device included in the system controller 112 (shown in FIG. 1)). Each of the three reconfigurable processing elements 502 is configured to perform one or more payload processing operations in the embodiment shown in FIG. 5.

Reconfigurable computer 500 includes five I/O interfaces 514. The five I/O interfaces 514 are individually referenced in FIG. 5 as I/O interface 514-1, 514-2, 514-3, 514-4, and 514-5, respectively. Two of the I/O interfaces 514-1 and 514-2 comprise PMC interfaces. Each of the two PMC interfaces 514-1 and 514-2 are coupled to a respective sensor module 102 (not shown in FIG. 5) that receives raw payload data for processing by the reconfigurable processing elements 502.

In the embodiment shown in FIG. 5, the PMC interfaces 514-1 and 514-2 and the processing elements 502 are coupled to one another using ten dual-port memory devices 216. This obviates the need to use multi-drop buses (or other interconnect structures) that are more susceptible to SEUs. The ten dual-port memory devices 516 are individually referenced in FIG. 5 as 516-1, 516-1, 516-2, 516-3, 516-4, 516-5, 516-6, 516-7, 516-8, 516-9, and 516-10, respectively.

Each of a first group of three dual-port memory devices 516-1, 516-2, and 515-3 has a first port coupled to a first PMC interface 514-1. The first PMC interface 514-1 uses the first port of each of these memory devices 516-1, 516-2, and 516-3 to read data from and write data to each of the memory devices 516-1, 516-2, and 516-3. A first configurable processing element 502-1 is coupled to a second port of each of these memory devices 516-1, 516-2, and 516-3. The first configurable processing element 502-1 uses the second port of each of these memory devices 516-1, 516-2, and 516-3 to read data from and write data to each of the memory devices 516-1, 516-2, and 516-3.

Each of a second group of three dual-port memory devices 516-4, 516-5, and 515-6 has a first port coupled to a second PMC interface 514-2. The second PMC interface 514-2 uses the first port of each of these memory devices 516-4, 516-5, and 516-6 to read data from and write data to each of the memory devices 516-4, 516-5, and 516-6. A second configurable processing element 502-2 is coupled to a second port of each of these memory devices 516-4, 516-5, and 516-6. The second configurable processing element 502-2 uses the second port of each of these memory devices 516-4, 516-5, and 516-6 to read data from and write data to each of the memory devices 516-4, 516-5, and 516-6.

Another group of two dual-port memory devices 516-7 and 516-8 are used to couple the first and second PMC interfaces 514-1 and 514-2, respectively, to a third processing element 502-3. Dual-port memory device 516-7 has a first port coupled to the first PMC interface 514-1 and a second port coupled to a third reconfigurable processing element 502-3. The first PMC interface 514-1 uses the first port of the memory device 516-7 to read data from and write data to the memory device 516-7. The third reconfigurable processing element 502-3 uses the second port of the memory device 516-7 to read data from and write data to the memory device 516-7. Dual-port memory device 516-8 has a first port coupled to the second PMC interface 514-2 and a second port coupled to a third reconfigurable processing element 502-3. The second PMC interface 514-2 uses the first port of the memory device 516-8 to read data from and write data to the memory device 516-8. The third reconfigurable processing element 502-3 uses the second port of the memory device 516-8 to read data from and write data to the memory device 516-8.

Two other dual-port memory devices 516-9 and 516-10 are used to couple the first and second reconfigurable processing elements 502-1 and 502-2, respectively, to the third reconfigurable processing element 502-3. Dual-port memory device 516-9 has a first port coupled to the first reconfigurable processing element 502-1 and a second port coupled to the third reconfigurable processing element 502-3. The first reconfigurable processing element 502-1 uses the first port of the memory device 516-9 to read data from and write data to the memory device 516-9. The third reconfigurable processing element 502-3 uses the second port of the memory device 516-9 to read data from and write data to the memory device 516-9. Dual-port memory device 516-10 has a first port coupled to the second reconfigurable processing element 502-2 and a second port coupled to the third reconfigurable processing element 502-3. The second reconfigurable processing element 502-2 uses the first port of the memory device 516-10 to read data from and write data to the memory device 516-9. The third reconfigurable processing element 502-3 uses the second port of the memory device 516-10 to read data from and write data to the memory device 516-10.

Three of the I/O interfaces 514-3, 514-4, and 514-5 comprise RAPIDIO(R) interfaces. Each of the RAPIDIO interfaces 514-4, 514-5, and 514-6 are coupled to a respective front-end processor 106 (not shown in FIG. 5) over one or more data buses 118 in the backplane 116 that support the RAPIDIO interconnect protocol. In the embodiment shown in FIG. 5, each of the reconfigurable processing elements 502-1, 502-2, and 502-3 is coupled to a respective one of the RAPIDIO interfaces 514-3, 514-4, and 514-5 in order to communicate with the one or more front-processors 106.

The reconfigurable computer 500 also includes a system control interface 508. The system control interface 508 is coupled to each of the reconfigurable processing elements 502 over a configuration bus 518. Also, the system control interface 508 is coupled to each of the PMC interfaces 514-1 and 514-2 over a system bus 520. The system control interface 508 provides an interface by which the system controller 112 (not shown in FIG. 5) is able to communicate with the reconfigurable processing elements 502 and the devices coupled to each of the PMC interfaces 514-1 and 514-2 in order to monitor and control the operation of the processing elements 502 and the devices coupled to the PMC interfaces 514-1 and 514-2.

In the embodiment shown in FIG. 5, the system control interface 508 includes a control bus interface 510. The control bus interface 510 is used to couple the system control interface 508 to the control bus 114 (shown in FIG. 1). This allows the system controller 112 and system control interface 508 to communicate over the control bus 114. In one implementation, the control bus interface 510 comprises a cPCI interface.

The system control interface 508 also includes a local controller 512. The local controller 512 carries out various control operations under the direction of the system controller 112. In the embodiment shown in FIG. 5, the local controller 512 performs various FPGA configuration management operations as described above in connection with the local controller 212 shown in FIG. 2. The configuration management operations performed by the local controller 512 include reading an FPGA configuration from the configuration memory 506 and loading the configuration into each of the reconfigurable FPGAs 504. The configuration management operations performed by the local controller 512 also includes single event upset (SEU) mitigation operations. Examples of such SEU mitigation operations include periodic and/or event-triggered refreshing of the FPGA configuration and/or FPGA configuration readback and compare. In one embodiment, the SEU mitigation operations described above in connection with FIGS. 3 and 4 are performed by the local controller 512 for each of the reconfigurable processing elements 502.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A reconfigurable computer, comprising:
   a reconfigurable processing element configured to process raw payload data in accordance with a configuration that is applied to the reconfigurable processing element;
   a multi-port communication device comprising a first port at which at least a portion of the raw payload data is written to the multi-port communication device and a second port at which at least a portion of the raw payload data written to the multi-port communication device is read by the reconfigurable processing element; and
   a controller coupled to the reconfigurable processing element, wherein the controller applies the configuration to the reconfigurable processing element and wherein the controller performs at least one single event upset mitigation operation.

2. The reconfigurable computer of claim 1, wherein the multi-port communication device comprises a multi-port memory.

3. The reconfigurable computer of claim 1, further comprising a first interface to receive the raw payload data from the source of the raw payload data and wherein the first port of the multi-port communication device is coupled to the first interface.

4. The reconfigurable computer of claim 3, wherein the first interface comprises a peripheral component interconnect mezzanine card interface.

5. The reconfigurable computer of claim 1, wherein the reconfigurable processing element is configured at run-time.

6. The reconfigurable computer of claim 1, wherein the reconfigurable processing element is reconfigured during operation in order to support multiple operating modes on a time-sharing basis.

7. The reconfigurable computer of claim 1, wherein the reconfigurable processing element is reconfigured to do at least one of fix an error in a previous configuration and add an additional processing capability.

8. The reconfigurable computer of claim 1, further comprising a memory device in which the configuration applied to the reconfigurable processing element is stored.

9. The reconfigurable computer of claim 8, wherein the memory device comprises a radiation-hardened memory device.

10. The reconfigurable computer of claim 1, wherein the controller comprises radiation-hardened circuitry.

11. The reconfigurable computer of claim 1, wherein the single event upset mitigation operation includes at least one of periodic refreshing of the configuration, event-triggered refreshing of the configuration, and configuration readback and compare.

12. The reconfigurable computer of claim 1, wherein the reconfigurable processing element comprises a reconfigurable field programmable gate array.

13. A system, comprising:
   a source of raw payload data; and
   a reconfigurable computer comprising:
      a reconfigurable processing element configured to process the raw payload data in accordance with a configuration that is applied to the reconfigurable processing element;
      a multi-port communication device comprising a first port at which at least a portion of the raw payload data is written to the multi-port communication device and a second port at which at least a portion raw payload data written to the multi-port communication device is read by the reconfigurable processing element; and
      a controller coupled to the reconfigurable processing element, wherein the controller applies the configuration to the reconfigurable processing element and wherein the controller performs at least one single event upset mitigation operation.

14. The system of claim 13, further comprising a back-end processor that further processes payload data that has been processed by the reconfigurable processing element.

15. The system of claim 14, wherein the back-end processor communicates payload data processed thereby to an Earth-bound device.

16. The system of claim 13, wherein the source of raw payload data comprises a sensor module comprising at least one sensor.

17. The system of claim 16, wherein the sensor module comprises at least one passive sensor and the raw payload data comprises sensor data.

18. The system of claim 15, wherein the sensor module comprises at least one active sensor and the raw payload data comprises sensor data.

19. The system of claim 13, further comprising a system controller in communication with the reconfigurable computer.

20. The system of claim 19, further comprising a control bus that couples the controller of the reconfigurable computer to the system controller.

21. The system of claim 20, wherein the reconfigurable computer further comprises a second interface that couples the controller to the control bus.

22. The system of claim 13, further comprising a data bus and wherein the reconfigurable computer further comprises a second interface that couples the reconfigurable computer to the data bus.

23. The system of claim 22, wherein the second interface comprises a RAPIDIO interface.

24. A method, comprising:
storing payload data received at a reconfigurable computer in a first multi-port communication device;
retrieving, by a reconfigurable processing element-included in the reconfigurable computer, the stored payload data from the first multi-port communication device;
processing the retrieved payload data in the reconfigurable processing element wherein the reconfigurable processing element processes the retrieved payload data in accordance with a configuration; and
performing at least one single event upset mitigation operation.

25. The method of claim 24, further comprising:
storing the processed payload data in a second multi-port communication device;
reading the stored processed payload data from the second multi-port communication device; and
supplying the read processed payload data to an external device.

26. The method of claim 24, wherein performing the at least one single event upset mitigation operation includes:
configuring the reconfigurable processing element with the configuration; and when a predetermined period of time has elapsed, reconfiguring the reconfigurable processing element with the configuration.

27. The method of claim 24, wherein performing the at least one single event upset mitigation operation includes:
configuring the reconfigurable processing element with the configuration; and
when a predetermined trigger event occurs, reconfiguring the reconfigurable processing element with the configuration.

28. The method of claim 24, wherein performing the at least one single event upset mitigation operation includes:
configuring the reconfigurable processing element with the configuration;
reading back the configuration of the reconfigurable processing element;
comparing at least a portion of the read configuration to at least a portion of a known-good configuration associated with the read configuration; and
if the at least a portion of the read configuration does not match the at least a portion of the know-good configuration, reconfiguring the reconfigurable processing element with the configuration.

29. The method of claim 25, wherein said comparing the at least a portion of the read configuration to the at least a portion of the known-good configuration associated with the read configuration comprises comparing a cyclic redundancy code for the at least a portion of the read configuration to a cyclic redundancy code for the at least a portion of the known-good configuration associated with the read configuration.

30. A reconfigurable computer comprising:
a reconfigurable means for processing raw payload data in accordance with a configuration;
a means for receiving at least a portion of the raw payload data and storing the at least a portion of the raw payload data;
a means for retrieving the stored raw payload data and supplying the stored raw payload data to the reconfigurable means for processing;
a means for applying the configuration to the reconfigurable means for processing; and
a means for performing at least one single event upset mitigation operation.

31. A reconfigurable computer, comprising:
a reconfigurable processing element configured to process raw payload data in accordance with a configuration that is applied to the reconfigurable processing element;
a data path comprising a multi-port memory device, the multi-port memory device comprising a first port at which at least a portion of the raw payload data is written to the multi-port memory device and a second port at which at least a portion raw payload data written to the multi-port memory device is read by the reconfigurable processing element; and
a control path comprising a controller coupled to the reconfigurable processing element, wherein the controller applies the configuration to the reconfigurable processing element and wherein the controller performs at least one single event upset mitigation operation.

* * * * *